United States Patent [19]

McMullen

[11] 4,304,289
[45] Dec. 8, 1981

[54] APPARATUS FOR CONTROLLING THE MOISTURE CONTENT OF FOUNDRY SAND

[75] Inventor: Carl R. McMullen, Waverly, Tenn.

[73] Assignee: Foundry Technology Inc., Waverly, Tenn.

[21] Appl. No.: 52,572

[22] Filed: Jun. 27, 1979

Related U.S. Application Data

[63] Continuation of Ser. No. 899,562, Apr. 24, 1978, abandoned.

[51] Int. Cl.³ .............................................. B22C 5/08
[52] U.S. Cl. ........................................ 164/154; 164/5
[58] Field of Search ............... 164/5, 154; 250/358 R; 134/57 R

[56] References Cited

U.S. PATENT DOCUMENTS

| | | | |
|---|---|---|---|
| 3,172,175 | 3/1965 | Hartley | 164/154 X |
| 3,693,079 | 9/1972 | Walker | 250/358 R X |
| 4,108,188 | 8/1978 | McMullen et al. | 164/5 X |
| 4,141,404 | 2/1979 | McMullen | 164/5 X |

Primary Examiner—Robert D. Baldwin
Attorney, Agent, or Firm—Kerkam, Stowell, Kondracki & Clarke

[57] ABSTRACT

A sand moisture control system for a sand casting foundry system incorporates non contact sensing techniques for controlling the moisture content of foundry sand by the addition of water at the muller or mixing operation of a sand casting system. The temperature of the foundry return sand is measured by an infrared detector while moisture content is measured by a microwave detector along the conveyor feed input to the muller or at the return sand holding tank. Electrical outputs from each detector corresponding to temperature and moisture are integrated to provide a signal corresponding to the % of moisture deviation from a predetermined value and this signal is utilized to control the amount of water added to the Muller.

13 Claims, 3 Drawing Figures

APPARATUS FOR CONTROLLING THE MOISTURE CONTENT OF FOUNDRY SAND

This is a continuation, of application Ser. No. 899,562, filed Apr. 24, 1978, now abandoned.

FIELD OF THE INVENTION

This invention relates to non-contact sensing of the moisture content of mold forming material such as, for example, foundry sand in a sand casting foundry system and means to control the application of water to the foundry sand material which is used in the casting process. A method and apparatus for controlling the moisture content of mold forming material in a continuous forward feed sand casting foundry system in accordance with the present invention utilizes non-contact sensing techniques to establish the percent moisture deviation from a predetermined value and the amount of water to be added to the foundry sand to achieve the desired moisture content. A first infra-red sensor positioned adjacent the return sand conveyor develops a first signal representing the temperature of the sand, while a micro-wave sensor positioned in a similar location develops a second moisture signal representative of initial moisture content. The signals are integrated to develop a control signal. The control signal is an analog signal which may be converted to a digital signal for controlling actuation of a solenoid valve for a fixed period (batch system) or the signal may be applied after non-linearization to a proportional control valve to control the addition of water to the sand through a proportional controller valve.

Various attempts have been made in the prior art to solve sand casting problems by providing water feed stations which add water to wet the sand and cooling water to cool the sand after the molding operation has been complete. Both temperature and moisture content of the foundry sand must be controlled within prescribed limits for a satisfactory molding operation, generally in the range of 2½-5% moisture by weight of the foundry sand. Generally, one or more probes are positioned in the sand hopper or Muller to sense either temperature or moisture content. Such probes may take the form of a temperature bulb or thermocouple for sensing temperature or electrical resistance probes for sensing conductivity (moisture). Signals derived from such sensors are used to control the addition of water to the foundry sand. Such systems suffer from the slow response of said sensors. Also, because the sensors are buried in the sand, they do not necessarily reflect true temperature or moisture of the sand at remote areas. Further, such systems fail to compensate for moisture loss during transport.

OBJECTIVES OF THE INVENTION

The limited ability of the prior art systems to cope with variations in the moisture content of sand at the feed station has been overcome by the present invention. To this end, a process and associated apparatus have been devised and are described herein which will meter water added to the foundry sand as a function of the moisture content as determined by monitoring with non-contact sensors both the temperature and moisture content of the sand. Advantageously, sensing is accomplished with respect to warm recycled foundry sand prior to its entering the Muller or mixing station where water, make-up sand and binder are added.

A further objective of the present invention is to provide a precise quantity of fluid, such as water, to a predetermined volume of foundry sand to maintain its moisture content at a predetermined level.

Another objective of the present invention is to measure the moisture content of foundry sand with non-contact temperature and moisture content sensing means and developing a control signal based on both measurements.

A still further objective of the present invention is to electronically process signals representing moisture content and temperature of sand in a predetermined zone in a conveyor system and utilize the processed signals to activate water valves. The foregoing and other objectives of the invention will become apparent in light of the drawings, specification and claims contained herein.

SUMMARY OF THE INVENTION

The present invention is an improvement to a continuous sand casting foundry system of the type which recycles casting sand to minimize the attended problems related to processing large quantities of sand and provides a system for controlling the moisture content of sand utilizing non-contact sensors. The disclosed system incorporates an infrared temperature sensor and a microwave sensor to provide a pair of signals representing both temperature and moisture content of the sand. The temperature and moisture content representative electrical functions are combined in an analog fashion and a control signal is developed to control a valve for the application of water to add water to the sand.

DESCRIPTION OF THE INVENTION

Figure 1:
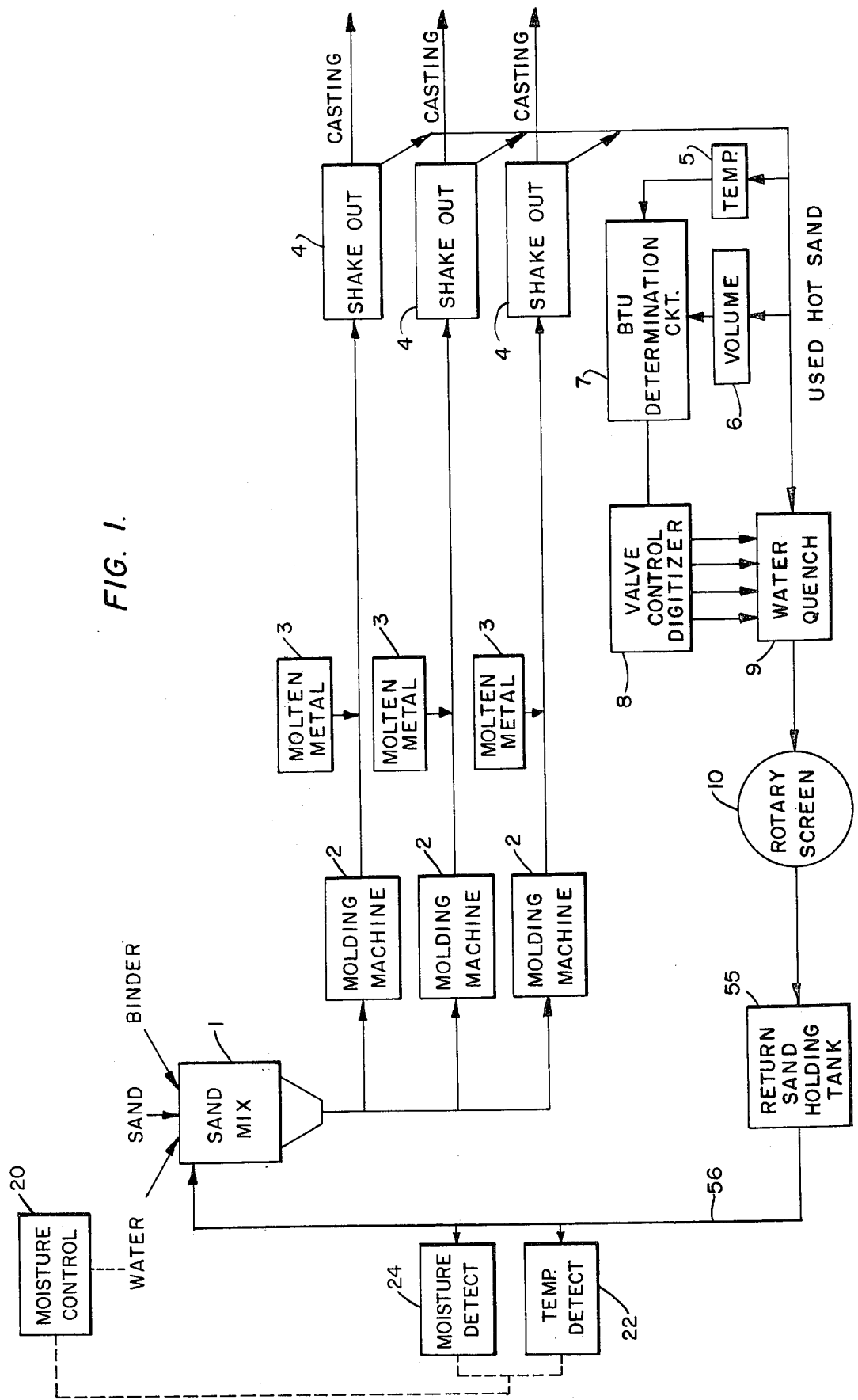
FIG. 1 is a functional block diagram of continuous sand casting foundry system incorporating the sand moisture control system of the present invention.

FIG. 1 illustrates a typical sand casting foundry system incorporating the advantage provided by this invention.

Referring to FIG. 1, the basic sand casting foundry system is disclosed in my copending application Ser. No. 818,653, now U.S. Pat. No. 4,141,404 filed July 25, 1977, and copending application Ser. No. 818,655 now U.S. Pat. No. 4,108,188, filed of even date therewith in the names of Carl McMullen and Gary Schlageter, both of which are assigned to the assignee of the present invention. The subject matter of said applications are hereby incorporated by reference.

Sand mix station 1 may comprise a conventional muller or mixer that combines fresh make-up sand with return sand and water and a binder to make a homogeneous mixture. This foundry sand which preferably should have a predetermined moisture content is fed via the lower hopper to a belt conveyor and is of a consistency which enables it to be packed about a pilot model in a conventional molding machine or operation 2 and retain its shape while being separated from the pilot model and combined with another mold half. Two sand mold halves are held together by elements of the system and transported along the belt conveyor to a molten metal pouring station 3 wherein the mold cavities are filled with molten metal.

To control the moisture content of the sand fed to the machine 2, the sand temperature and moisture content are measured at a control station 20 positioned along the return conveyor belt prior to return of the used sand to mixer 1. Alternatively, sensing may take place at the lower hopper or return sand holding tank 55, but preferably sensing should take place after the used sand is fed on the return conveyor 56 and prior to its being dumped in the mixer 1.

In a typical foundry, several production lines may be operating simultaneously. FIG. 1 illustrates a three (3) line operation wherein the foundry sand is fed to three separate parallel conveyor systems. Since each production operates in a similar fashion, for the sake of brevity, the operation of only one line will be described, but it should be noted that like elements have been designated with like reference characters.

The foundry sand mixture forming the mold, extracts some of the heat from the molten metal 3 which was poured into the mold cavity and the metal solidifies as the mold is transported along the conveyor belt to a conventional shakeout station 4. At the shakeout station the molds are vibrated or agitated sufficiently to separate the casting from the sand and the sprue is separated from the casting manually. The castings are conveyed to a work receiving station, while the hot sand is passed through a screen on a transversely arranged belt conveyor to be recycled to a return sand holding tank.

After the shakeout station 4, the hot sand which may be between 150°–325° F. in the sand recycled loop passes a temperature sensing station 5, a volume sensing station 6 and a cooling or water quench station 9. The temperature sensing station includes a noncontact temperature sensor which in a preferred embodiment is an infrared sensor which provides an electrical signal representing sand temperature without the necessity of coming into contact with the sand. At approximately the same point in the sand recycle loop, the volume sensing station 6 also is provided with a noncontact sensor which in a preferred embodiment is an ultrasonic sensor positioned above the moving belt and arrange to measure the precise height of the sand on the conveyor. These measurements are made over a predetermined increment of time and since the width of the conveyor is known (usually 76.2 cm), a precise measurement of sand volume obtained. The output of the noncontact sensors comprise electrical signals corresponding to temperature and volume of the return sand. These signals are applied to the BTU determination circuit 7 which combines the output of the infrared temperature sensor 5 with the volume signal from the ultrasonic sensor to create an analog signal that is forwarded to the valve control digitizer 8. The valve control digitizer generates signals similar to digital signals commonly used to energize digital displays for numerical readouts. However, in this application the digital signals are utilized to activate one or more individual valves controlling associated water quench nozzles at the water coating or quench station 9. The water quench nozzles are calibrated to deliver in response to the applied signals, different quantities of water to the hot sand. By selectively enabling the nozzles through the valve control digitizer, a precise quantity of water is sprayed over the sand to reduce its temperature. Advantageously, the sand is cooled to a temperature below 110° F. to 140° F.

The cooled sand is then transported to the rotary screen 10 which assures that the sand is broken down into individual grains before it is transported to the return sand holding tank 55. This rotary screen also provides a slight additional cooling effect due to tumbling and aeration of the sand. From the return sand hold tank, the cooled sand is transported to the sand mix station as required and the loop is complete.

Figure 2:
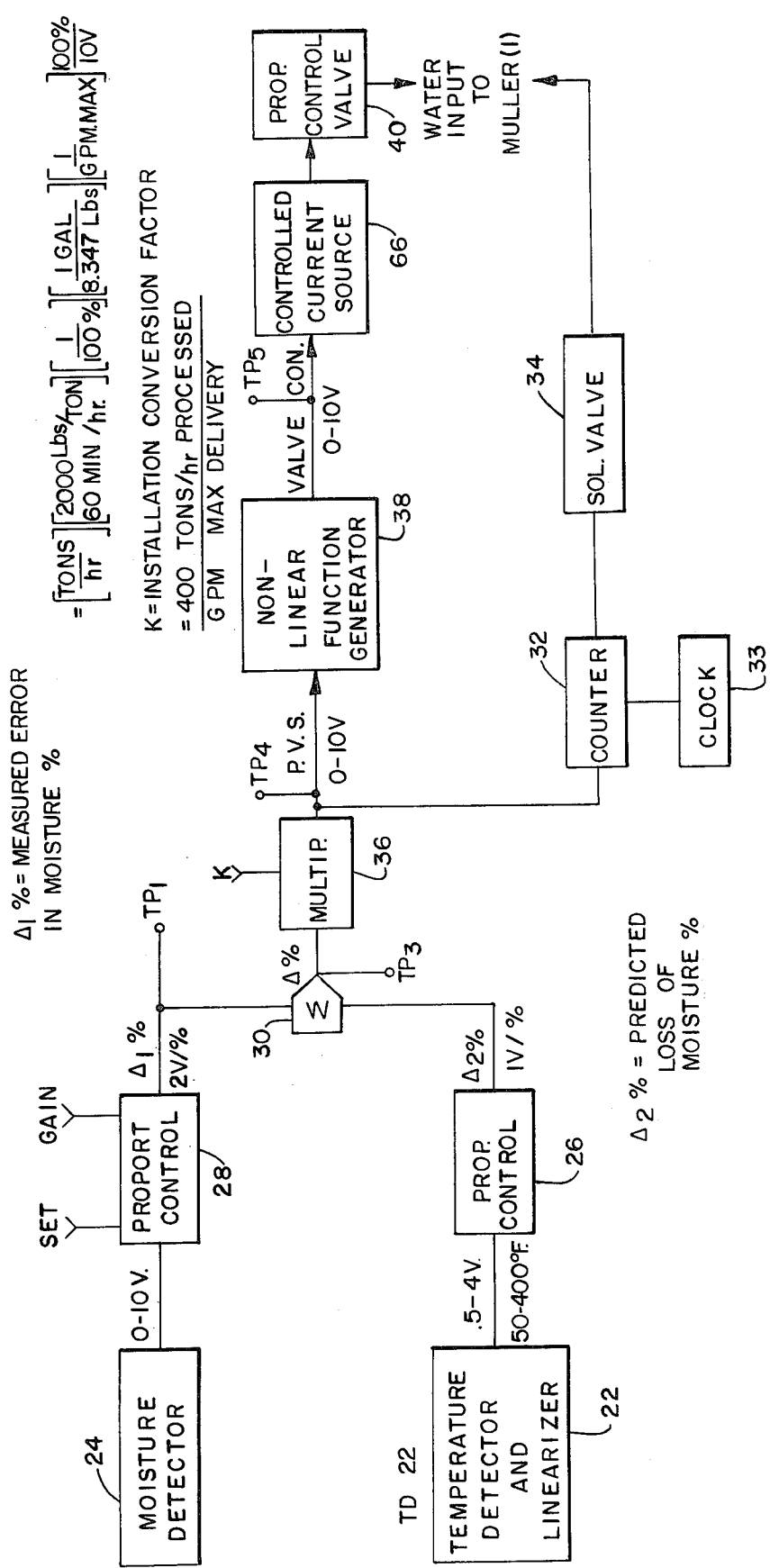
FIG. 2 is a functional block diagram of the circuitry of the present invention adapted to convert electrical functions of sand heat and moisture into a control signal for controlling application of water to the sand.

In a preferred embodiment of the invention, the control station 20 is disposed along conveyor 56 between return tank 55 and mixer 1 and includes a temperature sensor 22 which is an infrared sensor or detector, and a moisture sensor 24 which in this embodiment is a microwave sensor or detector. The details of the control circuit are shown in the functional block diagram of FIG. 2. However, a good overview of the invention can be obtained from applicant's publication *AQUATRAK*, a copy of which is filed as an addendum to this specification and which is hereby incorporated by reference.

The principles of operation are relatively simple. The temperature of burden is measured along the moving belt with a non-contact infrared sensing device which may be of the type manufactured and sold by the $E_2$ Thermodot of Carpenteria, Calif., under the model designation TD22. The moisture content is measured with a microwave sensing device which also avoids contact with the sand. The microwave device may be of the type illustrated and described in U.S. Pat. Nos. 3,534,260 and 3,693,079, the subject matter of which is hereby incorporated by reference. Such devices are generally commercially available through Automation Industries Ltd. or Pacific Automation Instruments, Ltd. of Vancover, B.C., Canada. Of course, other commercially available units might be utilized, provided the output voltages are compatible, i.e., 0–10 volt analog output signal.

The two signals are integrated to develop a control signal which is used to control the exact amount of water required to establish a certain % moisture level in the sand, preferably in the range of $2\frac{1}{2}$–5% by weight of sand, the exact percentage is usually dependent on the particular foundry operation. To this end, it should be recognized that the moisture sensor could not do the job alone, because it cannot compensate for moisture loss during mixing and transport. Thus, temperature sensing combined with moisture sensing is necessary for consistent moisture levels.

The aforementioned method of sensing free water in solid mixtures developed by Dr. Charles Walker, as described, in U.S. Pat. Nos. 3,534,260 and 3,693,079, is utilized to detect moisture levels to a very small degree and provides an analog output signal of 0–10 VDC. This signal from detector 24 is utilized to provide a signal relative to % moisture by weight of sand on a predetermined curve for the substrate material. Temperature detector 22 provides a 0.5–4 VDC signal (50° F. to 400° F.) which is used to adjust or modify the primary signal to relate to true water requirement. To this end, the outputs of detectors 22, 24 are applied respectively, to proportionate controllers 26, 28. Controller 26 includes a scale and offset control set by the operator to reflect anticipated temperature loss. The scale setting sets the range of operation, while the offset sets the low point at which moisture is added. The output of controller 26 ($\Delta 2\%$) provides a measure of expected moisture loss during mixing and transport, proportional to the measured temperature of the sand. Controller 28 includes a SET control which sets the moisture level and provides a signal (Δ1%) which is a measure of error or deviation of moisture in % from the set level. The controller 26 is non-linear and follows the vapor pressure curve, but operation is only on a linear portion of a small segment of the curve. Controller 28 is linear and the amount of microwave energy absorbed is directly proportional to the moisture content.

The two adjusted signals are integrated with respect to time in adder 30 which provides an output which is representative of a predicted total make-up-plus loss in moisture. This signal after adjustment for sand being processed in multiplier 36, is used to open a valve for water delivery for the present time, thus providing a constant flow rate a certain number of gallons of water.

For a batch feed system, an integration of "counts" occurs over a period of time determined by belt run time or other open position of the sand hopper feeding device. When the belt stops, i.e., integration stops and transfers of "count" level takes place. The output of adder 30 is applied to step-up/step-down 32 which controls a solenoid valve 34 for controlled addition of water for batch mixing. Counter 32 is synchronized to a clock 33 which is in turn tied into a batch feed system so that it starts and stops along with sand flow.

A proportional valve system 40 may be employed, in which case the output of adder 30 is applied to the valve 40 through multiplier 36 and non-linear function generator 38. The output of generator 38 is applied to driver 66 which in turn provides an output control signal to the proportionate control valve 40.

Figure 3:
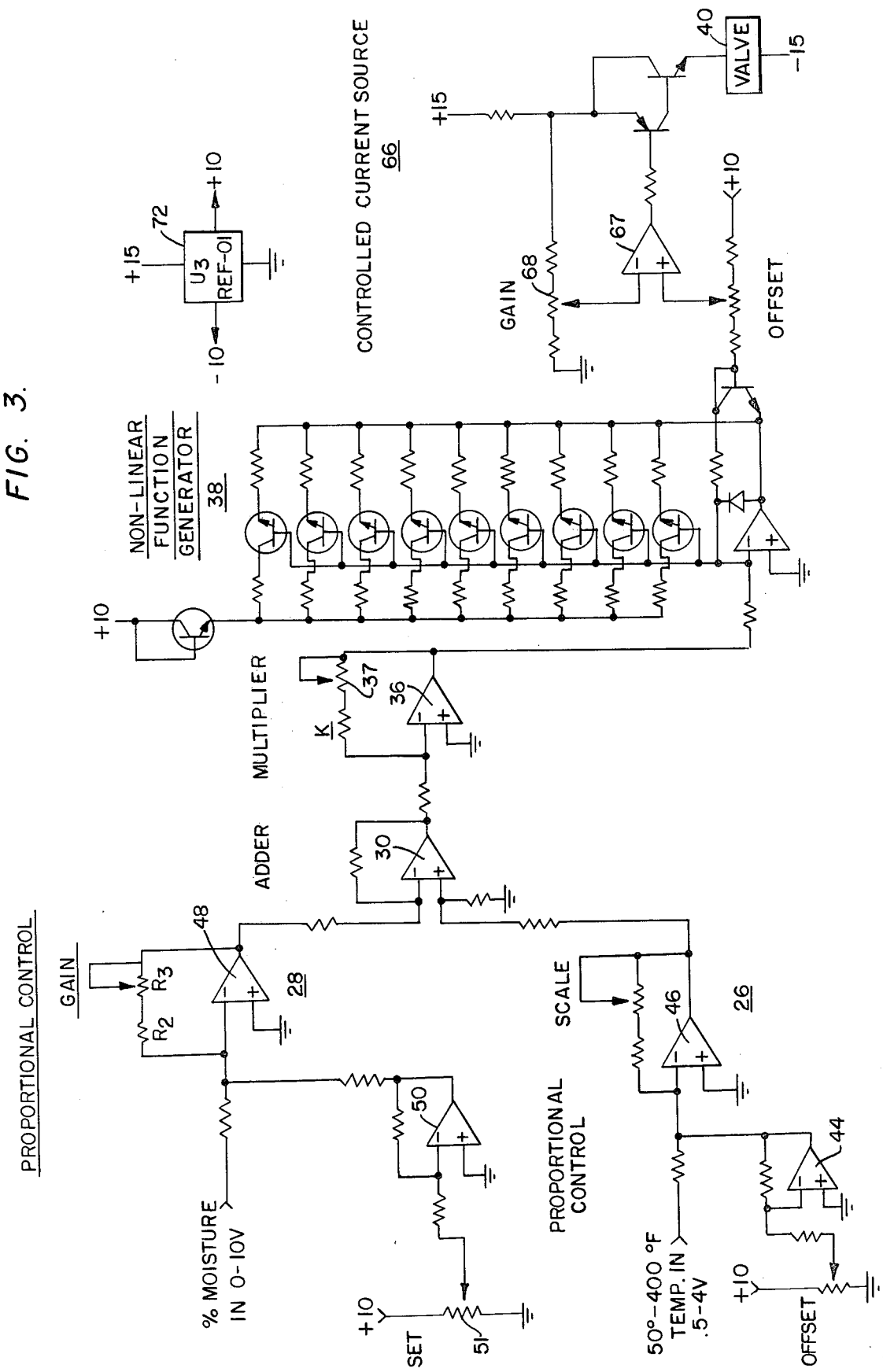
FIG. 3 is an electrical schematic diagram of the water application valve control system of a preferred embodiment of the present invention.

Referring to FIG. 3, the output of the infrared temperature sensor is a signal ranging from 0.5 to 4 volts representing the temperature of the sand. 1 volt corresponds to 100° F. This signal is applied at input jack 42 and then to the (−) input of proportioned controller comprising op amps 44 and 46. The output from op amp 46 representing the predicted loss of moisture at a set temperature of the sand is applied to the (+) input of adder 30.

The microwave moisture detector produces a signal ranging from 0 to 10 volts representing a measure of the moisture content of the sand which is applied through op amp 48 to the (−) input of adder 30. The (−) input of op amp 48 is connected to a set control comprising op amp 50 and set resistor 51. The output of adder 30 is applied to the (−) input of multiplier 36. Resistor 37 is set to reflect the amount of sand to be processed in tons/hour. The outputs of multiplier 46 is fed to a non-linear function generator 38 which approximates the curve characteristics of the proportional control valve. Function generator 38 comprises op amp 52 and eleven 2N3565 transistors 53-63, diode CR1 and associated resistors. A 0-10 v proportional output signal is applied thrugh offset resistor 64 to the (+) input of op amp 67 of driver stage 66. The (−) input of amplifier 66 is maintained at the desired level by setting of gain potentiometer 68. A 4.20 ma. output driving signal to the valve control is developed by transistors 69 and 70.

While a particular embodiment of the invention has been described, it will be apparent to those skilled in the art that various modifications thereof may be made without departing from the true spirit and scope of the invention. Accordingly, it is intended by the appended claims to cover all such modifications which embody the inventive features as defined in the claims.

I claim:

1. An apparatus for controlling the moisture content of forming material in a continuous forward feed sand casting foundry system comprising:
    a mixer for combining sand, water, binder and return mold forming material;
    a mold forming material conveyor for transporting said material from a mold forming station to said mixer;
    a first non-contact sensor for generating a first signal from the material on the moving conveyor representing the temperature of the material on said conveyor;
    a second non-contact sensor for generating a second signal from the material on said conveyor representing the moisture content of the material on said conveyor;
    valve means adapted to be energized for adding water to the material in the mixer and
    control means responsive to said first signal and said second signal for controlling the energization of said valve means to thereby control the volume of water added by said valve means.

2. An apparatus as defined in claim 1 wherein said first sensor is an infrared sensor arranged to provide an electrical signal as a function of the temperature content of the mold forming material and said second sensor is a microwave sensor arranged to provide an electrical signal as a function of the moisture content of the mold forming material.

3. An apparatus as defined in claim 2 wherein said control means includes means for adjusting said second signal in accordance with the anticipated moisture loss of the material during mixing and transport.

4. An apparatus as defined in claim 3 wherein said control means includes means for comparing said first signal to a preset moisture level to develop a third signal corresponding to a deviation in moisture content of the material at the measuring location from the preset moisture level and integrating means for integrating the adjusted second signal and third signal to provide a control signal for energizing said valve means.

5. An apparatus as defined in claim 4 wherein said control means includes means for modifying said control signal as a function of the amount of material being processed in tons/hour.

6. Apparatus as defined in claim 4 wherein said system is a batch system and said valve means is a solenoid valve.

7. Apparatus as defined in claim 6 wherein said solenoid valve is a proportional control valve and further including a non-linear function generator responsive to said modified control signal for controlling operation of said proportional control value.

8. An apparatus for monitoring and controlling the moisture content of forming material in a continuous forward feed sand foundry system comprising:
    a first non-contact sensor adapted to be disposed along a movable mold forming material conveyor for generating a first signal representing the temperature of the material on said movable conveyor;
    a second non-contact sensor adapted to be disposed along said movable conveyor for generating a second signal representing the moisture content of the material on said movable conveyor; and;
    control means responsive to said first signal and said second signal for developing an output signal indicative of the % moisture to be added to the material to compensate for moisture loss in transport and maintain the % moisture of the material at a desired level and means responsive to said output signal for adding water to the mold forming material so as to maintain the % moisture of the material at the desired level.

9. An apparatus as defined in claim 8 wherein said first sensor is an infrared sensor arranged to provide an electrical signal as a function of the temperature of the mold forming material and said second sensor is a microwave sensor arranged to provide an electrical signal as a function of the moisture content of the mold forming material.

10. An apparatus as defined in claim 9 wherein said control means includes means for adjusting said second signal in accordance with the anticipated moisture loss of the material during mixing and transport on said movable conveyor.

11. An apparatus as defined in claim 10 wherein said control means includes means for comparing said first signal to a preset moisture level to develop a third signal corresponding to a deviation in moisture content of the material at the measuring location from the preset moisture level.

12. An apparatus as defined in claim 11 wherein said control means includes integrating means for integrating the adjusted second signal and third signal to provide a control signal for energizing said valve.

13. An apparatus as defined in claim 12 wherein said control means includes means for modifying said control signal as a function of the amount of material being processed in tons/hour.

14. An apparatus for controlling the moisture content of mold forming material in a sand casting foundry system comprising a non-contact sensing means for monitoring the moisture content of said material and developing a signal corresponding to a deviation of the moisture content of said mold forming material from a preset level and a non-contact sensing means for monitoring the temperature of said material and developing a signal corresponding to the expected moisture loss of said mold forming material, means for integrating said signals to develop a control signal corresponding to the amount of water to be added to the material to bring it up to the desired moisture content, and means responsive to said control signal for adding water to said material.

15. An apparatus as defined in claim 14 wherein said first mentioned non-contact sensing means includes a microwave sensor for monitoring the moisture content of said material and developing a signal in response thereto and said second mentioned non-contacting sensing means includes an infrared detector for monitoring the temperature of said material and developing a signal in response thereto and further including valve control means responsive to said developed control signals for controlling the application of water to said material.

* * * * *